US008316140B2

(12) United States Patent
Huettner

(10) Patent No.: US 8,316,140 B2
(45) Date of Patent: Nov. 20, 2012

(54) METHOD FOR CONTROLLING A DEVICE IN A NETWORK OF DISTRIBUTED STATIONS, AND NETWORK STATION

(75) Inventor: Ingo Huettner, Pattensen (DE)

(73) Assignee: Thomson Licensing, Boulogne-Billancourt (FR)

(*) Notice: Subject to any disclaimer, the term of this patent is extended or adjusted under 35 U.S.C. 154(b) by 692 days.

(21) Appl. No.: 11/578,815

(22) PCT Filed: Apr. 14, 2005

(86) PCT No.: PCT/EP2005/003937
§ 371 (c)(1),
(2), (4) Date: Oct. 19, 2006

(87) PCT Pub. No.: WO2005/104441
PCT Pub. Date: Nov. 3, 2005

(65) Prior Publication Data
US 2007/0239821 A1 Oct. 11, 2007

(30) Foreign Application Priority Data
Apr. 20, 2004 (DE) .......................... 10 2004 018 980

(51) Int. Cl.
*G06F 15/16* (2006.01)
(52) U.S. Cl. ........ 709/229; 709/208; 709/217; 709/223; 709/226; 709/231
(58) Field of Classification Search .................. 709/208, 709/217, 220, 223, 226, 229, 231, 227; 726/12
See application file for complete search history.

(56) References Cited
U.S. PATENT DOCUMENTS
6,466,971 B1 * 10/2002 Humpleman et al. ........ 709/223
(Continued)

FOREIGN PATENT DOCUMENTS
EP 1376977 1/2004
(Continued)

OTHER PUBLICATIONS
Sung et al, "UPnP Based Intelligent Multimedia Service Architecture for Digital Home Network", 2006, IEEE.*
(Continued)

*Primary Examiner* — Ramy M Osman
(74) *Attorney, Agent, or Firm* — Tutunjian & Bitetto, P.C.

(57) ABSTRACT

The invention relates to the technical field of home networks. A home network based on the current UPnP (Universal Plug and Play) standard allows data to be interchanged between network subscriber stations. An extension to this standard also provides for the interchange of AV data (Audio/Video data). One of the basic ideas of the UPnP specification is that it is possible to control any UPnP device using a standard HTML browser. To this end, every UPnP device has a web server on which the HTML pages for controlling the device are stored. It is permissible to embed a "JAVA applet" into the HTML page in order to control the device. This means that device control can be made very convenient. However, when it is necessary to control a device which needs to interchange data on the basis of the UPnP-AV standard, the JAVA applet first needs to know whether and, if so, which devices of the MediaRenderer or MediaServer type are present in the network. The JAVA security restrictions prevent the requests required for this purpose from being made from the JAVA applet however. The invention implements an additional device ascertainment service in the device for control in order to make these requests possible. This device ascertainment service communicates with the loaded JAVA applet in the remote control device using standard SOAP messages. It is thus possible to use the advantageous method of embedding a JAVA applet into an HTML page even to control UPnP-AV devices.

16 Claims, 4 Drawing Sheets

U.S. PATENT DOCUMENTS

| | | | |
|---|---|---|---|
| 6,546,419 B1 * | 4/2003 | Humpleman et al. | 709/223 |
| 7,085,814 B1 * | 8/2006 | Gandhi et al. | 709/208 |
| 7,100,069 B1 * | 8/2006 | Hickman et al. | 709/208 |
| 7,130,895 B2 * | 10/2006 | Zintel et al. | 709/220 |
| 7,644,174 B2 * | 1/2010 | Ryu et al. | 709/231 |
| 2001/0033554 A1 | 10/2001 | Ayyagari et al. | |
| 2002/0027569 A1 | 3/2002 | Manni et al. | |
| 2002/0029256 A1 * | 3/2002 | Zintel et al. | 709/218 |
| 2002/0112058 A1 * | 8/2002 | Weisman et al. | 709/227 |
| 2003/0101294 A1 * | 5/2003 | Saint-Hilaire et al. | 710/11 |
| 2003/0105854 A1 * | 6/2003 | Thorsteinsson et al. | 709/223 |
| 2005/0021714 A1 * | 1/2005 | Yook et al. | 709/223 |
| 2005/0022210 A1 * | 1/2005 | Zintel et al. | 719/318 |
| 2005/0188193 A1 * | 8/2005 | Kuehnel et al. | 713/155 |
| 2005/0267935 A1 * | 12/2005 | Gandhi et al. | 709/203 |
| 2006/0168000 A1 * | 7/2006 | Bodlaender | 709/205 |
| 2007/0239821 A1 * | 10/2007 | Huettner | 709/201 |
| 2008/0209536 A1 * | 8/2008 | Hutter et al. | 726/12 |

FOREIGN PATENT DOCUMENTS

| | | |
|---|---|---|
| JP | 2004104839 | 4/2004 |
| WO | WO 00/78001 | 12/2000 |
| WO | WO0209350 | 1/2002 |
| WO | WO02054697 | 7/2002 |
| WO | WO03049374 | 6/2003 |
| WO | WO2004008686 | 1/2004 |

OTHER PUBLICATIONS

Ritchie et al, "UPnP AV Architecture:1", 2002, UPnP Forum.*
Intel Corporation: "Overview of UPnP AV Architecture", White Paper, Jul. 2, 2003, pp. 1-9.
Search Report Dated Aug. 24, 2005.
Gsottberger, Yvonne et al., "Embedding Low-Cost Wireless Sensors into Universal Plug and Play Environments", Wireless Sensor Networks, Springer-Verlag, Berlin/Heidelberg, Jan. 14, 2009, pp. 291-306.

* cited by examiner

```xml
<?xml version="1.0" encoding="UTF-8"?>
<scpd xmlns="urn:schemas-thomson-net:service-1-0">
 <specVersion>
   <major>1</major>
   <minor>0</minor>
 </specVersion>
 <actionList>
  <action>
    <name>CheckTopologyChanged</name>
    <argumentList>
     <argument>
      <name>LastCheckCount</name>
      <direction>in</direction>
      <relatedStateVariable>A_ARG_TYPE_LastCheckCount</relatedStateVariable>
     </argument>
     <argument>
      <name>CheckCount</name>
      <direction>out</direction>
      <relatedStateVariable>A_ARG_TYPE_CheckCount</relatedStateVariable>
     </argument>
     <argument>
      <name>TopologyChanged</name>
      <direction>out</direction>
      <relatedStateVariable>A_ARG_TYPE_TopologyChanged</relatedStateVariable>
     </argument>
    </argumentList>
  </action>
  <action>
   <name>GetDeviceLocations</name>
   <argumentList>
    <argument>
     <name>LastCheckCount</name>
     <direction>in</direction>
     <relatedStateVariable>A_ARG_TYPE_LastCheckCount</relatedStateVariable>
    </argument>
    <argument>
     <name>DeviceLocations</name>
     <direction>out</direction>
     <relatedStateVariable>A_ARG_TYPE_DeviceLocations</relatedStateVariable>
    </argument>
    <argument>
     <name>TopologyChanged</name>
     <direction>out</direction>
     <relatedStateVariable>A_ARG_TYPE_TopologyChanged</relatedStateVariable>
    </argument>
   </argumentList>
  </action>
  <action>
   <name>GetResource</name>
   <argumentList>
    <argument>
     <name>Location</name>
     <direction>In</direction>
     <relatedStateVariable>A_ARG_TYPE_Location</relatedStateVariable>
    </argument>
    <argument>
```

Fig. 4

```
    <name>MimeResource</name>
    <direction>out</direction>
    <relatedStateVariable>A_ARG_TYPE_MimeResource</relatedStateVariable>
   </argument>
  </argumentList>
 </action>
</actionList>
<serviceStateTable>
 <stateVariable sendEvents="no">
  <name>A_ARG_TYPE_LastCheckCount</name>
  <dataType>i4</dataType>
 </stateVariable>
 <stateVariable sendEvents="no">
  <name>A_ARG_TYPE_CheckCount</name>
  <dataType>i4</dataType>
 </stateVariable>
 <stateVariable sendEvents="no">
  <name>A_ARG_TYPE_TopologyChanged</name>
  <dataType>boolean</dataType>
 </stateVariable>
 <stateVariable sendEvents="no">
  <name>A_ARG_TYPE_DeviceLocations</name>
  <dataType>string</dataType>
 </stateVariable>
 <stateVariable sendEvents="no">
  <name>A_ARG_TYPE_Location</name>
  <dataType>string</dataType>
 </stateVariable>
 <stateVariable sendEvents="no">
  <name>A_ARG_TYPE_MimeResource</name>
  <dataType>string</dataType>
 </stateVariable>
</serviceStateTable>
</scpd>
```

Fig. 4 (Continued)

```
<?xml version="1.0" encoding="UTF-8"?>
<scpd xmlns="urn:schemas-thomson-net:service-1-0">
 <specVersion>
  <major>1</major>
  <minor>0</minor>
 </specVersion>
 <serviceStateTable>
  <stateVariable sendEvents="no">
   <name>A_ARG_TYPE_Dummy</name>
   <dataType>string</dataType>
  </stateVariable>
 </serviceStateTable>
</scpd>
```

Fig. 5

METHOD FOR CONTROLLING A DEVICE IN A NETWORK OF DISTRIBUTED STATIONS, AND NETWORK STATION

This application claims the benefit, under 35U.S.C. §365 of International Application PCT/EP05/003937, filed Apr. 14, 2005, which was published in accordance with PCT Article 21(2) on Nov. 3, 2005 in English and which claims the benefit of Germany patent application No. 102004018980.3, filed Apr. 20, 2004.

FIELD OF THE INVENTION

The invention relates to the technical field of home networks.

BACKGROUND OF THE INVENTION

Efforts to network together increasing numbers of electronic devices in the household or home are very well advanced. A wealth of different standards for networking devices has been formulated with partly different objectives. One of the systems provides for the devices to be networked, on the basis of the "Internet protocol" IP. There is already a first version of a standard available for this system. The system has become known by the abbreviation UPnP, which stands for Universal Plug and Play. The corresponding standard is currently available in version 1.1. More detailed information regarding the UPnP system and the associated standard can be found on the official Internet page of the UPnP consortium at www.upnp.org. The UPnP system has no restrictions regarding device types. This is intended to make it possible to network both devices from the consumer electronics field, such as TVs, DVD players, set-top boxes, video recorders, camcorders, etc., and other devices in the household, for example washing machines, refrigerators, heating controllers, coffee machines, lighting and blind controllers, alarm systems and so on. Personal computers may likewise be regarded as belonging to the category of consumer electronic devices. These are also included in the UPnP system and can be integrated into the network too.

However, the UPnP system contains no specification for the bottom layers of the OSI/ISO reference model for data communication. This relates particularly to the physical layer and the data link layer. The UPnP system therefore no longer contains a specification about what transmission medium needs to be used to transmit the data for interchange. A very wide variety of transmission standards are permissible for this. Examples of these are the Ethernet protocol, the IEEE 1394 protocol, and even wireless transmission based on IEEE 802.11x, Bluetooth or HIPERLAN/2 are likewise suitable.

The UPnP specification (see www.upnp.org) describes the structure of devices based on the UPnP standard and how to control them. One of the basic ideas of this specification is that it is possible to control any UPnP device using a standard HTML browser. To this end, every UPnP device has a web server on which the HTML pages for controlling the device (the "presentation pages") are stored.

BRIEF DESCRIPTION OF PREFERRED EMBODIMENTS

The UPnP specification makes no precise statements about the rules which need to be observed when creating these HTML pages (e.g. whether Java Script is permitted or not). However, in order to be compatible with as many browsers as possible (that is to say to allow the UPnP device to be controlled from as many "control points" as possible), it is advantageous if a UPnP device's HTML page has the simplest design possible. In this context, the following two variants can be mentioned, in particular:

Exclusive use of standard HTML. Appropriate actions by the user then result in fresh loading of a web page adapted by the UPnP device.

Embedding of a JAVA applet into the HTML page in order to control the device.

Particularly the second variant is of spacial interest, since, after all, HTML is primarily not actually a language for device control—instead, however, ordinary functions which are required for device control such as "pressing buttons", "moving sliders", using cursor keys to preselect control elements, etc. can be performed relatively easily in a JAVA applet. In this case, the JAVA applet can communicate with the UPnP device for control using the standard UPnP SOAP commands, i.e. no additional communication methods need to be introduced. In this context, the abbreviation SOAP stands for the standardized Simple Object Access Protocol.

If only the respective device needs to be controlled (e.g. a UPnP refrigerator), then the restricted (for security reasons) capabilities of the JAVA applet (in comparison with a JAVA application) are entirely sufficient. However, some devices require additional information about the network and also additional communication options.

The reason for this is that a specification for transmitting AV data (audio/video data) between network subscriber stations was also devised as part of the UPnP standardization and was concluded in June 2002. The exact title of this specification is: UPnP AV Architecture: 0.83 dated Jun. 12, 2002. This specification defines three different types of devices for transmitting AV data. First, a "MediaServer"; this denotes that device which is selected as the source of the AV data. Secondly, there is the device type MediaRenderer, which is a device which is used as a data sink for the AV data. Thirdly, the inherent device type provided in addition is the type ControlPoint. By way of example, a universal remote control for the AV devices is regularly suitable as ControlPoint device. Alternatively, a personal computer in the network may also perform this task, however, or else a TV set with remote control may likewise be suitable as ControlPoint. The ControlPoint device communicates with two other UPnP devices which are suitable as data source and data sink for a desired AV connection. The ControlPoint device initializes and configures the two devices for the AV connection, so that the desired data stream can also be put on. The task of a ControlPoint device is thus typically to set up an AV connection between two network subscribers, possibly to make changes to the settings of the two devices (these typically involve volume adjustment, brightness adjustment, contrast adjustment, tone adjustment, definition adjustment and so on) and, when the desired AV data stream has been transmitted, to cut the connection again, that is to say to request that both devices on the AV connection delete the data which characterize the connection. ControlPoint devices are not specified in the UPnP standard to the extent that a full API (Application Interface Program) is known for this device type, however. By way of example, the ControlPoint used may also be a Windows XP computer which is not designed on the basis of the extended UPnP-AV standard and hence does not know the difference between MediaRenderer and MediaServer devices at all. There is thus a need to allow the devices designed on the basis of the UPnP-AV standard to be controlled to the full extent by such devices too.

When, by way of example, a UPnP device needs to be controlled on the basis of the UPnP-AV standard, it is also necessary—if a MediaServer is involved, for example—to have the option of connecting this MediaServer to a MediaRenderer in the network. To do this, however, the applet first needs to know whether and, if so, which MediaRenderers are present in the network. The task of finding UPnP devices in the network belongs to the ControlPoint on the basis of UPnP, but the JAVA applet is not able to adopt these ControlPoint functionalities completely, since the JAVA security restrictions prevent this. The programming language JAVA does not support TCP/IP-based communication with devices which are not identical to the device from which it has been loaded. It also does not support communication via multicast, which a ControlPoint needs to master if it wants to find other UPnP devices, however. For this reason, this task needs to be performed by the UPnP device for control in another way if the aim is to provide this convenient control option in the device which is to be controlled. The invention proposes providing a "device ascertainment module" for this purpose. This is not subject to the security restrictions and is able to request the necessary information from the other network stations. The uploaded JAVA applet is intended to communicate with this "device ascertainment module" using the standard UPnP-SOAP commands/messages.

The solution described also affords advantages when the UPnP device to be controlled does not have an incorporated JAVA applet. In this case, the device is controlled using standard HTML pages. This is done by virtue of a respective new HTML page being generated for new insertions (changes to the visible user interface). This is done by a software module for generating HTML pages. If it becomes necessary in this case for the software module to have additional information about devices which are present in the network, this can be arranged by the "device ascertainment module" in this case too.

The measures cited in the dependent claims allow advantageous developments and improvements.

If the other devices in the network are known and a connection needs to be set up, it is necessary for the applet also to be able to communicate with these devices. However, this also is not possible on account of the aforementioned Java security restrictions. This problem can be solved by introducing a "forwarding module" on the device which is to be controlled. That is to say that when the applet wishes to communicate with another device, it sends the message to the "forwarding module" in its own device (together with the destination address using the standard SOAP commands), which sends this message to the desired device and finally forwards the response to the applet.

The UPnP standard contains a concept for forming "services" for providing particular functionalities. It is therefore advantageous if the "device ascertainment module" and the "forwarding module" are in the form of UPnP services. In this case, the device-internal communication is simpler because it is possible to resort to the existing communication aids based on the UPnP standard.

BRIEF DESCRIPTION OF THE DRAWINGS

Exemplary embodiments of the invention are illustrated in the drawings and are explained in more detail in the description below.

In the drawings:

FIG. 4 shows an example of the inventive device ascertainment module in the form of an XML description;

FIG. 5 shows an example of the inventive forwarding module in the form of an XML description.

DETAILED DESCRIPTION OF PREFERRED EMBODIMENTS

Figure 1:
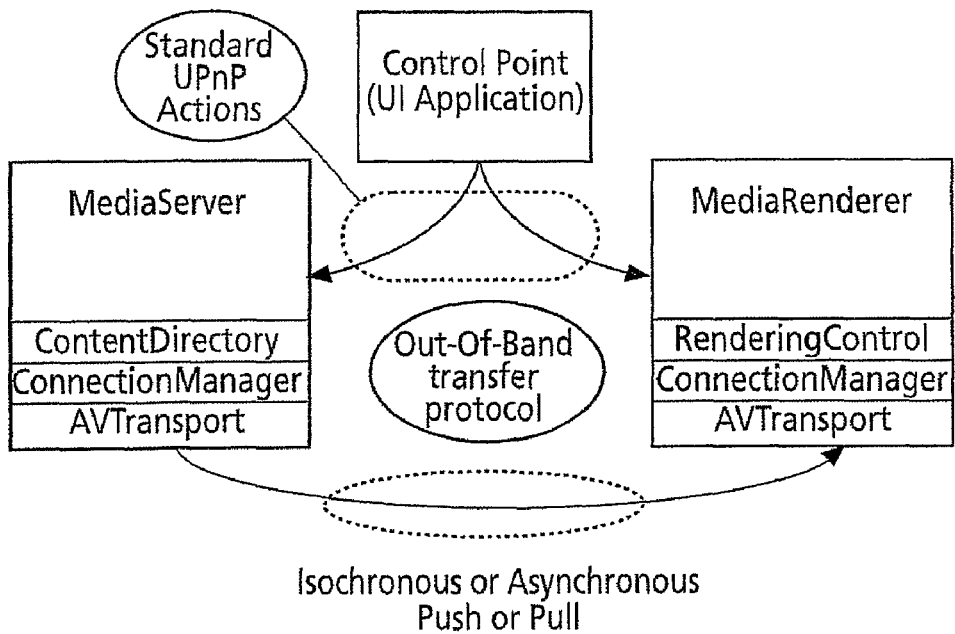
FIG. 1 shows a basic diagram of the transmission of AV data between two network stations based on UPnP AV Architecture: 0.83.

Based on the UPnP standard's AV specification cited above, AV connections can be set up between two devices in a home network. In this case, the UPnP AV specification distinguishes between three different station types. First, a "MediaServer". That station on an AV connection which is intended to serve as the data source is assigned to the device type MediaServer in line with the UPnP AV specification. Secondly, there is the device type MediaRenderer. This type is assigned to the device which has been selected as the data sink for the AV connection. In addition, there is also the device type ControlPoint. This device type is regularly assigned to the device type on which the control menus are displayed. Normally, this is therefore a device which is equipped with a display. As an example, the TV set in a home network is mentioned. Other examples are a personal computer which is integrated in the home network or a universal remote control with a display, which is likewise integrated in the home network through wireless transmission. FIG. 1 shows the basic classification of network stations which are required for an AV connection. The MediaServer device contains or has access to an AV data stream which is stored locally, for example, or is received externally. The MediaServer device has access to the AV data and is able to transmit an associated AV data stream to another network station via the network. In this case, the AV data stream is transmitted using a transfer protocol in line with the transmission medium available in the network. The data transmission formats supported by the MediaServer are explicitly defined in the ContentDirectory service for every possible resource. Typically, the device type MediaServer can be assigned to one of the following devices: VCR, CD/DVD player, camera, camcorder, PC, set-top box, satellite receiver, audio tape player, etc. To select a particular AV content, a module for a "ContentDirectory" is usually implemented in the MediaServer in line with the UPnP standard. In addition, there is also another module, which is called the ConnectionManager and with which the ControlPoint device communicates when setting up a connection to a MediaRenderer.

A MediaRenderer device receives the AV data stream transmitted by the MediaServer and outputs it either as image information or as audio information. In the same way, the MediaRenderer device likewise contains an implementation of the ConnectionManager module for the communication with the ControlPoint device when setting up a connection. In addition, the MediaRenderer device contains an implementation of a RenderingControl module. This module receives commands for setting reproduction characteristics such as volume, tone, picture definition, contrast, brightness, color and so on and implements these commands. As an example of devices to which the MediaRenderer device type should be assigned in the home network, mention is made of a TV set, a stereo amplifier and an MP3 player. Depending on the transmission format implemented, the MediaServer or the MediaRenderer also has an AvTransport service which is used to control the data transfer and the reproduction (e.g. PLAY, STOP, FAST FORWARD, etc.).

The ControlPoint device coordinates the data transport between MediaServer and MediaRenderer. It is likewise used to implement the control commands from the operator and forward them to the appropriate devices on the AV connection. In this case, suitable examples are the commands Play, Stop, Pause, Fast forward, Rewind, in particular. The ControlPoint device is active, in particular, when setting up a logical connection between two network stations. It is likewise used when, after an AV connection has fulfilled its purpose, that is to say the AV data stream has been transmitted as selected, setup of the AV connection needs to be terminated.

As FIG. 1 shows, the transmission of the AV data in line with the implemented AV transport protocol is independent of the communication with the ControlPoint device. The data stream is therefore transmitted even when the ControlPoint device has logged off from the network after the AV connection has been set up. Since the known transport protocols are standardized, more detailed information in this regard is not given below. On the other hand, a more detailed explanation is given regarding what additional means a MediaServer or MediaRenderer needs to have in order to be able to provide the functionality of setting up AV connections in these devices directly.

Figure 2:
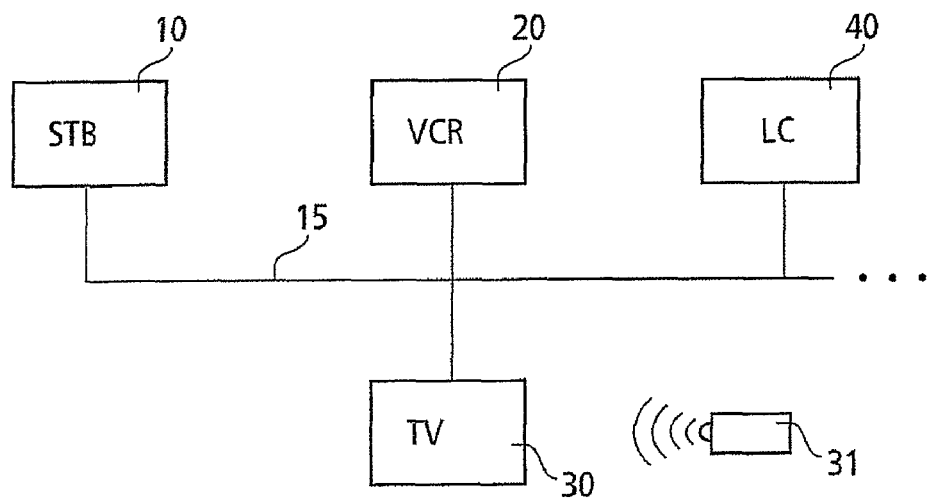
FIG. 2 shows an exemplary network with standard UPnP devices and UPnP-AV devices.

FIG. 2 shows a simple home network. The reference numeral 10 denotes a set-top box for receiving digital television and radio programs. The reference numeral 20 denotes a video recorder. The reference numeral 30 denotes a TV set. Shown separately, there is also the remote control 31. All of the devices need to be controlled using the HTML pages provided by UPnP. The task of the remote control is therefore to assist in navigation on the web page of the device which is shown on the TV set's browser. The reference numeral 40 denotes a lighting control device. The reference numeral 15 denotes the bus connection for networking the devices. An example mentioned here is a bus connection based on the Ethernet bus standard. However, the invention is independent of which bus system is actually used. Examples of other bus connection standards are IEEE 1394, IBM Token Ring, Powerline, Interbus, CAN and wireless transmission standards such as IEEE 802.11b and HIPERLAN/2. The devices set-top box, video recorder and TV set are UPnP-AV-standard-compliant devices, and the lighting controller 40 is a UPnP-standard-compliant device.

Figure 3:
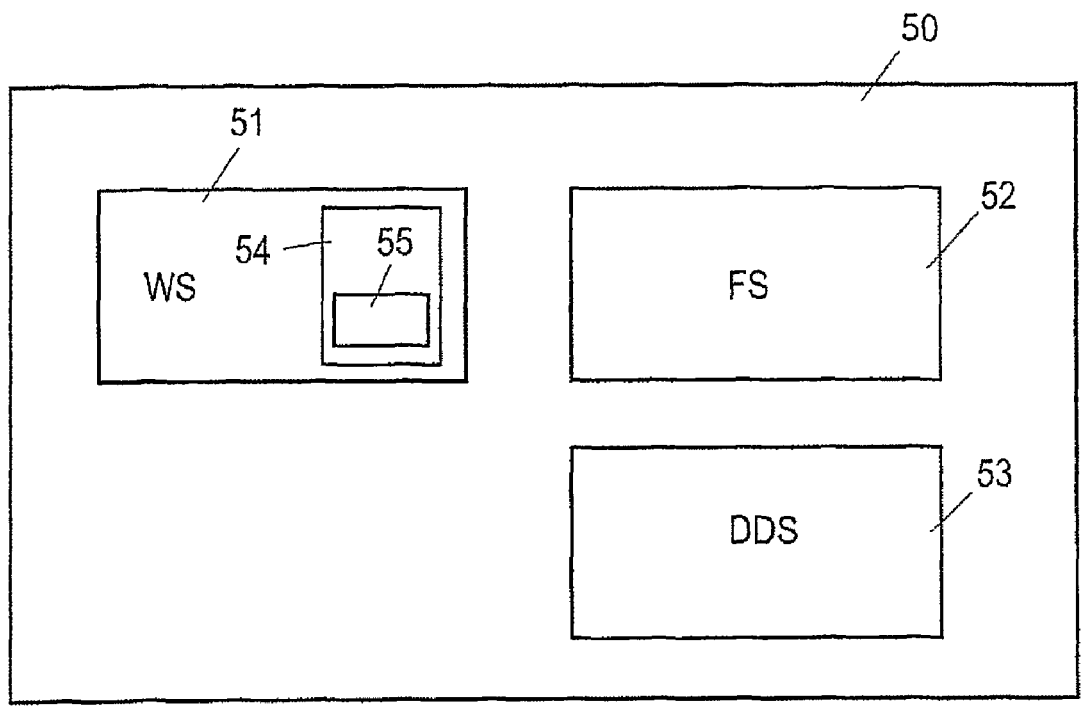
FIG. 3 shows a first exemplary embodiment based on the invention in the form of a block diagram of a UPnP-AV device of the MediaServer type.

FIG. 3 shows the design of a UPnP-AV device based on the invention. It may be of the type MediaServer or MediaRenderer. This device, like any UPnP device, contains a WebServer 51. The WebServer stores a number of HTML pages 54. These pages are used to control the device using another UPnP device which exists in the network. Typically, an external device with a display is used for control, that is to say the TV set 30, for example. To this end, the external device's browser loads an HTML page 54 from the Web Server 51 in the device 50 for control, via the network 15. It is subsequently assumed that the HTML page 54 has an incorporated JAVA applet 55. This JAVA applet is also loaded into the external device as part of the loading operation for the HTML page 54. It is executed on this external device.

To be able to control the full scope of functions on the UPnP-AV device 50 (that is to say including the functionality of setting up a fresh AV connection, for example), the UPnP-AV device 50 also contains a device ascertainment module 53. This software module is not a JAVA applet and is therefore not subject to the security restrictions which are stipulated in the latter. It is therefore able to communicate with the external devices in a manner of a ControlPoint device. This module allows the UPnP Device Descriptions of every UPnP device in the network to be read. This makes it possible to find out which MediaRenderer devices or which MediaServer devices are present in the network. Since this device ascertainment module communicates with the applet by means of the SOAP messages, it is possible to list the devices ascertained in the external device.

If, finally, it is also necessary to set up a new AV connection, the JAVA applet transmits the commands required for this to a forwarding module 52, in the UPnP-AV device 50, using the standard SOAP messages. The SOAP message indicates the destination address for the device to which a connection needs to be set up. This module forwards the sequence of messages for setting up an AV connection, that is to say particularly the UPnP instruction PrepareForConnection (STB, VCR), to the respective devices' services when a connection needs to be set up between the MediaServer device set-top box and the MediaRenderer device video recorder, for example.

An XML description for the device ascertainment module is shown in FIG. 4. This module's methods are listed under the heading <action>. The CheckTopologyChanged method is used to check whether the network topology has changed. If anything has changed, the new device addresses (IP addresses) can be ascertained using the GetDeviceLocations method. The GetResource method can be used to load files from the relevant device's WebServer. This allows more precise information to be obtained regarding the individual network stations. In this case, it is possible to load the Device-Description for the desired device, for example. This is an XML description for the requested device. It also contains the information regarding whether the device is of the MediaRenderer and/or MediaServer type.

An XML description for the forwarding module is shown in FIG. 5. This does not define any method at all and thus ensures that all arriving commands/messages are forwarded. The commands such as PrepareForConnection are delivered to the forwarding module by the JAVA applet in a form embedded in a standard SOAP message. They are converted into a UPnP message using the SOAP interface.

In the exemplary embodiment, the two software modules are in the form of a UPnP service. In a modified exemplary embodiment, these modules may be in the form of proprietary modules individually or combined in a single module.

Figure 6:
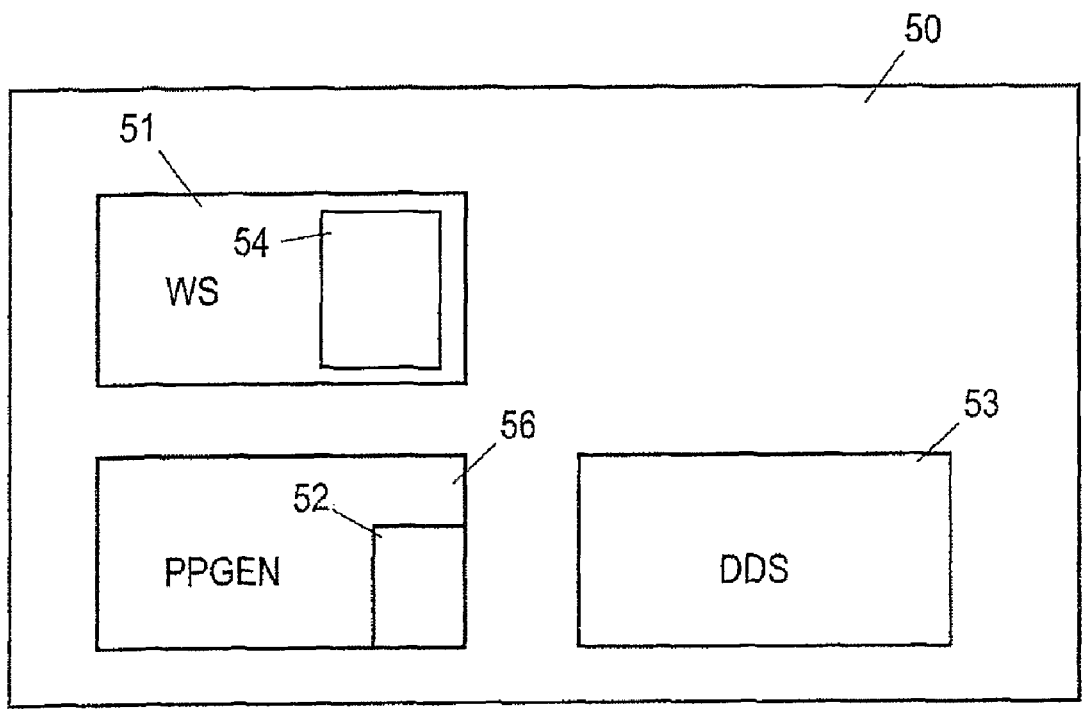
FIG. 6 shows a second exemplary embodiment based on the invention in the form of a block diagram of a UPnP-AV device of the MediaServer type.

A further exemplary embodiment is shown in FIG. 6. The same reference numerals denote the same components as in FIG. 3. In this case, the web server of the UPnP-AV device 50 holds simple HTML pages available without an incorporated JAVA applet for controlling the device. If only standard HTML is used, the programming options are limited. To allow particular control functions such as a slider for setting parameters in this case, it is necessary to generate respectively updated HTML pages and to load these pages afresh in each case. For this reason, the UPnP-AV device 50 contains, as an additional component, a software module 56 for producing HTML pages. This module receives the SOAP commands issued by the loaded HTML page, evaluates them and generates the new HTML page.

To implement the functionality of setting up AV connections, it is appropriate for the device ascertainment module 53 likewise to be implemented. The forwarding module 52 may in this case be integrated in the software module 56. In a further refinement, the device ascertainment module may also be integrated in the software module 56.

The invention can be put to appropriate use for the devices which can be controlled using web pages, particularly HTML pages. The invention can be used to particular advantage in devices which are designed on the basis of the UPnP-AV standard.

The invention claimed is:

1. A method for controlling a device in a network of stations, comprising:

providing a web server in which functionalities of a device to be controlled are made available on the web server in the form of one or more information pages generated using a description language and are preselected by a remote control device in order to control the device to be controlled, the network stations being designed to communicate on the basis of the UPnP standard, with UPnP standing for Universal Plug and Play, the network station in the network being classified in the type of a remote control device and a device to be controlled, in the network, network stations of the UPnP type MediaServer and of the UPnP type MediaRenderer may exist, wherein an information page incorporates an executable software module which is loaded and started in the remote control device in order to control the device to be controlled, wherein the executable software module being produced in the form of a JAVA applet, wherein security restrictions prevent the executable software module from discovering stations of a particular type; and sending a search request from the device to be controlled of the type media server to at least one other device in the network by means of an additionally implemented device ascertainment module in the device to be controlled of the UPnP type MediaServer for finding a network station of the particular UPnP type MediaRenderer or in the device to be controlled of the UPnP type MediaRenderer for finding a network station of the particular UPnP type MediaServer, wherein the device ascertainment module is not a JAVA applet and not being part of an additional implementation of a UPnP ControlPoint functionality in the device to be controlled.

2. The method of claim 1, wherein the implemented device ascertainment module communicates with a module for creating the information pages generated using a description language, and ascertained devices are displayed using an information page which has been created by the module and reloaded.

3. The method of claim 1, wherein the software module communicates with the device ascertainment module in the device to be controlled, and the ascertained devices are displayed on the remote control device by virtue of the software module inserting the ascertained devices in the information page which incorporates the software module.

4. The method of claim 1, comprising:

providing an additionally implemented forwarding module in the device to be controlled is used to interchange messages from and to the remote control device with one or more network stations.

5. The method of claim 4, wherein the software module communicates with the device ascertainment module or with the forwarding module using standardized SOAP commands, with SOAP standing for Simple Object Access Protocol.

6. The method of claim 1, wherein the device ascertainment module and the forwarding module are in the form of an UPnP-standard-compliant UPnP service.

7. The method of claim 1, wherein the description language for producing information pages is of an HTML type, and HTML stands for Hyper Text Markup Language.

8. A network station, comprising:

a web server on which one or more information pages generated using a description language are provided for controlling the network station, wherein an information page incorporates an executable software module which can be loaded and executed by a remote control device in order to control a device to be controlled; and a device ascertainment module adapted for sending out a search request from the device to be controlled to at least one other device in the network for finding a network station of an UPnP type MediaRenderer or an UPnP type MediaServer;

wherein the device ascertainment module is not a JAVA applet and not being part of an additional implementation of a UPnP ControlPoint functionality in the network station.

9. The network station of claim 8, wherein the executable software module is in a form of a JAVA applet.

10. The network station of claim 8, wherein the executable software module is designed to communicate with the device ascertainment module in a device for control, and ascertained devices can be displayed on the remote control device by virtue of the ascertained devices being inserted by the software module.

11. The network station of claim 8, comprising:

a forwarding module provided in the network station that supports interchange of messages between an external network station and the executable software module in the remote control device.

12. The network station of claim 11, wherein a JAVA applet communicates with the device ascertainment module or with the forwarding module using standardized SOAP messages, with SOAP standing for Simple Object Access Protocol.

13. The network station of claim 8, wherein the network station is designed for data interchange on a basis of an UPnP standard, where UPnP stands for Universal Plug and Play.

14. The network station of claim 8, wherein the device ascertainment module and a forwarding module are in a form of a UPnP-standard-compliant UPnP service.

15. The network station of claim 8, wherein the device ascertainment module is designed such that the device ascertainment module finds devices of the UPnP type MediaRenderer when the network station is of the UPnP type MediaServer, and finds devices of the UPnP type MediaServer when the network station is of the UPnP type MediaRenderer.

16. The network station of claim 8, wherein the description language for generating information pages is of an HTML type, where HTML stands for Hyper Text Markup Language.

* * * * *